United States Patent
Ogawa

(10) Patent No.: US 6,355,126 B1
(45) Date of Patent: Mar. 12, 2002

(54) METHOD AND APPARATUS FOR FORMING TIRE REINFORCING LAYER

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/308,996

(22) PCT Filed: Oct. 2, 1998

(86) PCT No.: PCT/JP98/04464

§ 371 Date: Aug. 18, 1999

§ 102(e) Date: Aug. 18, 1999

(87) PCT Pub. No.: WO99/17920

PCT Pub. Date: Apr. 15, 1999

(30) Foreign Application Priority Data

Oct. 3, 1997 (JP) .............................................. 9-287772

(51) Int. Cl.$^7$ ................................................ B29D 30/38
(52) U.S. Cl. ........................ 156/117; 156/123; 156/264; 156/397; 156/406.4; 156/512
(58) Field of Search ................................ 156/117, 397, 156/123, 133, 134, 405.1, 406.4, 264, 516, 523, 512; 152/560, 548, 526, 533; 901/40

(56) References Cited

U.S. PATENT DOCUMENTS

| | | | | |
|---|---|---|---|---|
| 1,453,865 A | * | 5/1923 | Dickinson et al. | 156/117 |
| 1,728,957 A | | 9/1929 | Dickinson | |
| 2,902,082 A | * | 9/1959 | Watson et al. | 156/405.1 |
| 3,431,962 A | * | 3/1969 | Kersker et al. | 152/560 |
| 3,826,297 A | * | 7/1974 | Alderfer | 152/560 |
| 4,861,406 A | | 8/1989 | Baker et al. | |
| 5,169,482 A | * | 12/1992 | Böttcher | 156/405.1 |

FOREIGN PATENT DOCUMENTS

EP 0 928 680 A1 7/1999

* cited by examiner

Primary Examiner—Geoffrey L. Knable
(74) Attorney, Agent, or Firm—Oliff & Berridge, PLC

(57) ABSTRACT

Method and apparatus for highly efficiently forming a tire reinforcing layer on an outer peripheral surface of a rigid core (13), in which ribbon pieces (33) each comprised of parallel rubber-coated cords (17) are successively adhered to the outer peripheral surface of the core (13) in a circumferential direction thereof, with the side edges of the ribbon pieces in close contact with those of adjacent ribbon pieces. A plurality of cords (17) can be set by one adhering operation, thereby reducing the number of adhering operations in forming a tire reinforcing layer.

6 Claims, 6 Drawing Sheets

FIG._1

FIG_2

FIG. 4
(a)
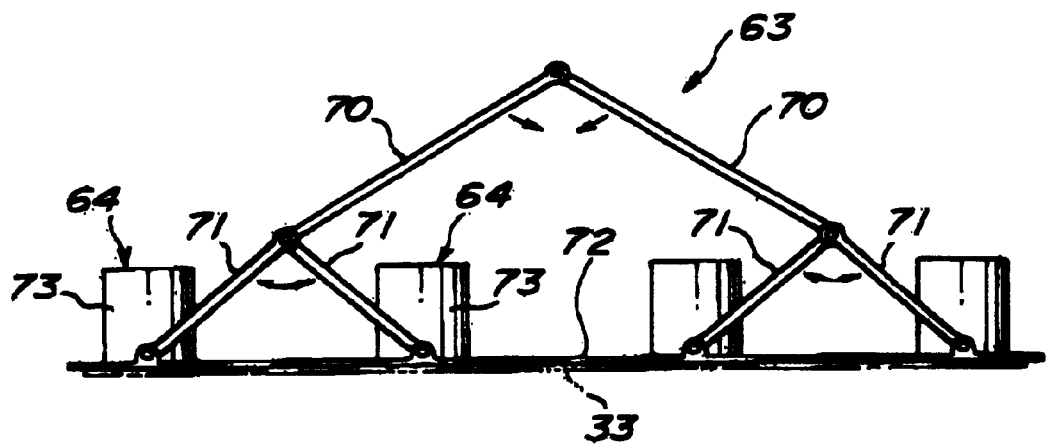
(b)
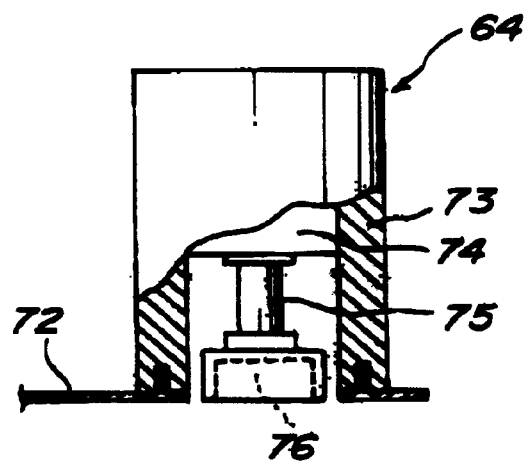

FIG_5
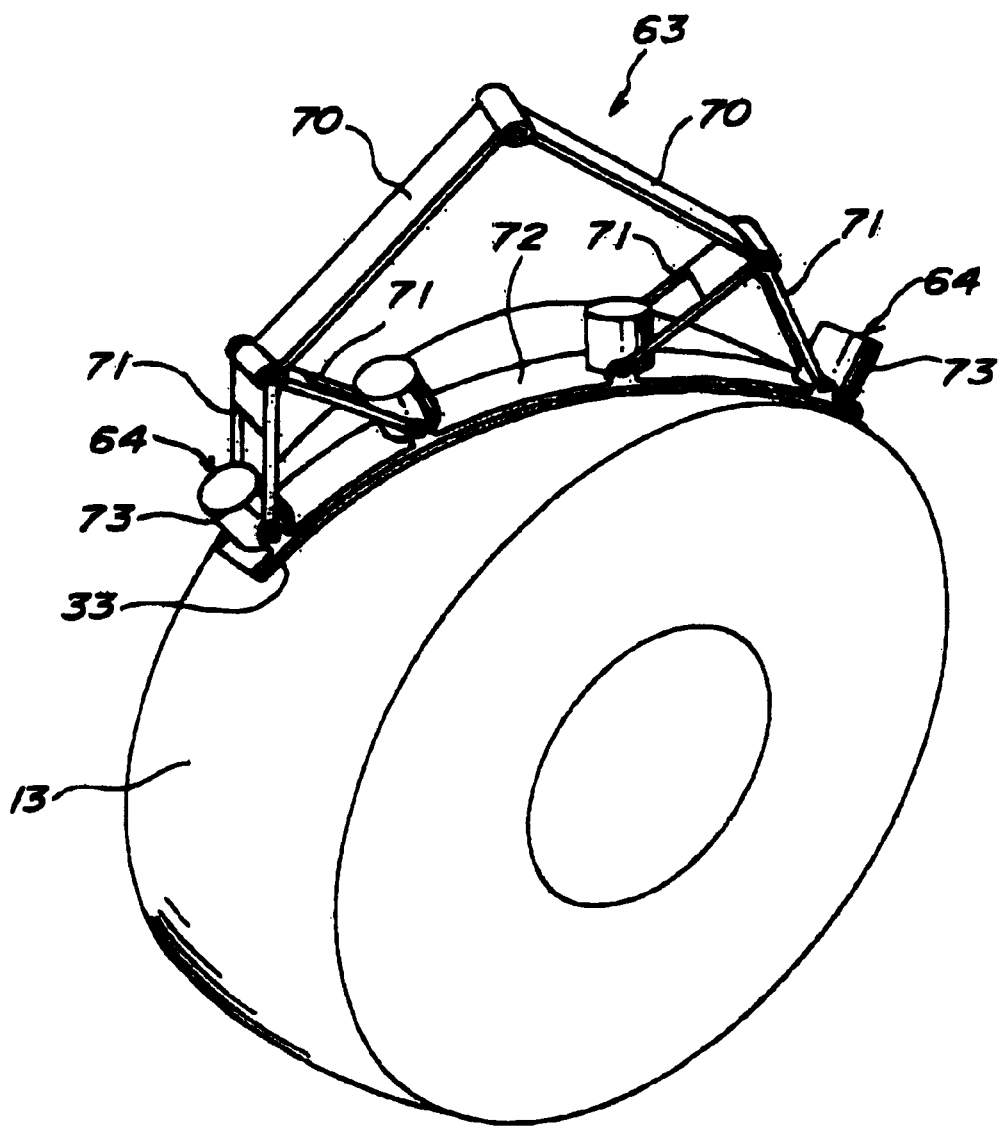

FIG_6
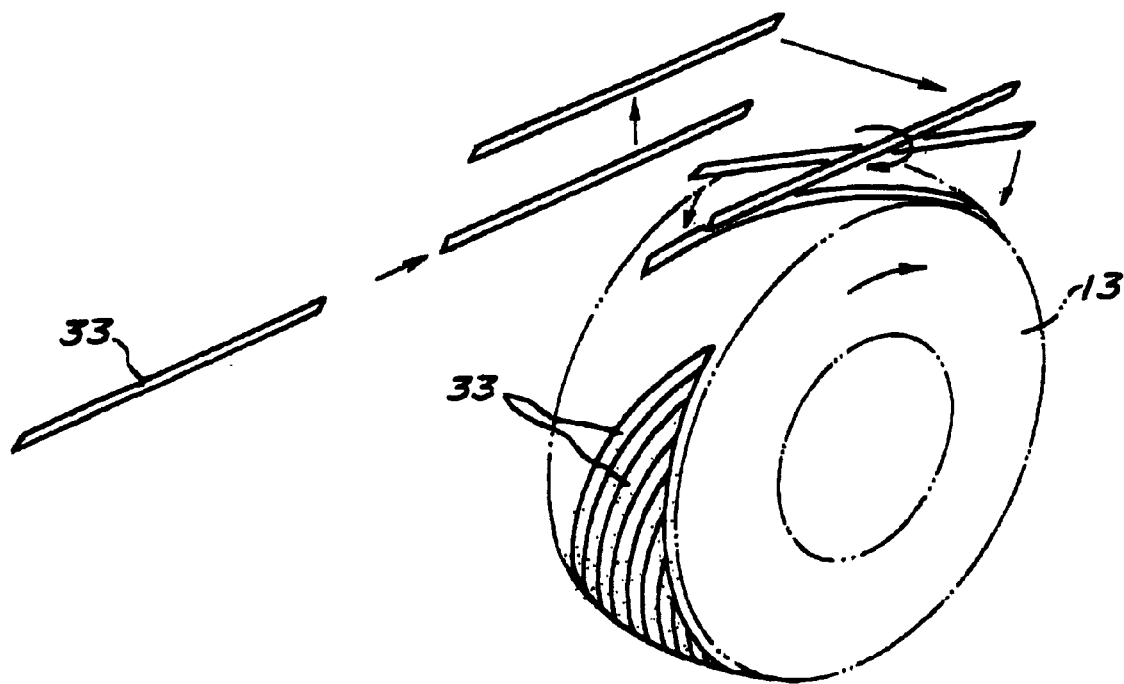
FIG_7
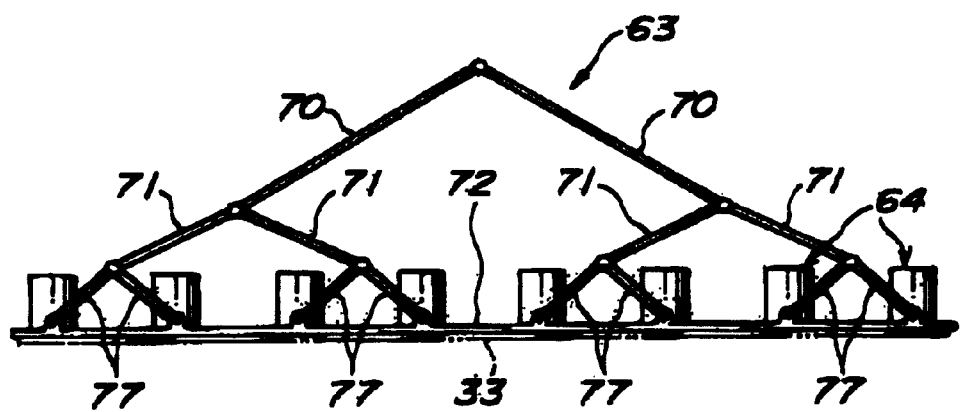

METHOD AND APPARATUS FOR FORMING TIRE REINFORCING LAYER

TECHNICAL FIELD

The present invention relates to a method and an apparatus for forming a tire reinforcing layer either directly or indirectly on the outer peripheral surface of a rigid core having a circular outer contour.

BACKGROUND ART

A conventional method and apparatus for forming a tire reinforcing layer on the outer peripheral surface of a rigid core with a substantially toroidal shape are disclosed, for example, in JP-A-05-185533.

In this instance, a reinforcing element comprising a single cord is supported by a mounting head which is moved to one side, in the width direction, of the crown portion of a core which is slowly rotating and a leading end of the reinforcing element is then clamped by a clip. Subsequently, the mounting head is moved obliquely along the surface of the crown portion of the core to the other side thereof, so that the reinforcing element is fed from the mounting head and adhered onto the outer peripheral surface of the core as being inclined at a constant angle with respect to the equatorial line of the core. The reinforcing element is then cut by a cutter at a location which is spaced a predetermined distance from its leading edge. These steps are repeated so that the reinforcing elements are successively adhered to the outer peripheral surface of the core in parallel with each other to form a belt layer.

However, in such conventional method and apparatus for forming the belt layer, since the reinforcing element to be adhered to the outer peripheral surface of the core is comprised of a single thin cord, there is a problem that a number of adhering operations of the reinforcing element are required to form a belt layer so that the operational efficiency is low.

Moreover, since the adhesion of the reinforcing element is performed by moving the mounting head in a direction in which the reinforcing member is adhered, there is a problem that, when the reinforcing element assumes a small inclination angle relative to the equatorial line of the core, or when the extending direction of the reinforcing element approaches the equatorial line of the core, it is necessary to move the mounting head over a relatively long distance which corresponds to the length of the reinforcing element to be adhered, thereby further lowering the operational efficiency.

It is an object of the present invention to provide a method and an apparatus for forming a tire reinforcing layer with an improved efficiency, either directly or indirectly on the outer peripheral surface of a rigid core having a circular outer contour.

DISCLOSURE OF THE INVENTION

The present invention provides a method for forming a tire reinforcing layer, which comprises the steps of: transferring a strip, which is comprised of a plurality of rubber-coated cords extending in parallel with each other, to a location adjacent to a rigid core having a circular outer contour, and cutting the strip into a predetermined length to form a ribbon pieces; transferring the ribbon piece onto an outer peripheral surface of the rigid core and adhering the ribbon piece to said outer peripheral surface as being inclined with reference to an equatorial line of the rigid core by a predetermined angle; and rotating the rigid core about a center axis thereof, by an angle which corresponds to the length of the ribbon piece in the circumferential direction; said steps being repeated so that the ribbon pieces are successively adhered to the outer peripheral surface of the rigid core while side edges of adjacent ribbon pieces are brought into close contact with each other.

The present invention also provides an apparatus for forming a tire reinforcing layer, which comprises: transferring and cutting means for transferring a strip, which is comprised of a plurality of rubber-coated cords extending in parallel with each other, to a location adjacent to a rigid core having a circular outer contour, and cutting the strip into a predetermined length to form a ribbon piece; transferring and adhering means for transferring the ribbon piece onto an outer peripheral surface of the rigid core and adhering the ribbon piece to said outer peripheral surface as being inclined with reference to an equatorial line of the rigid core by a predetermined angle; and rotating means for rotating the rigid core about a center axis thereof, by an angle which corresponds to the length of the ribbon piece in the circumferential direction.

According to the present invention, first of all, with the transferring and cutting means, a strip is transferred to a location adjacent to a rigid core having a circular outer contour, and is cut into a predetermined length to form a ribbon piece. Subsequently, with the transferring and adhering means, the ribbon piece is transferred onto an outer peripheral surface of the rigid core and adhering the ribbon piece to the outer peripheral surface as being inclined with reference to an equatorial line of the rigid core by a predetermined angle. Thereafter, with the rotating means, the rigid core is rotated about a center axis thereof, by an angle which corresponds to the length of the ribbon piece in the circumferential direction.

In this instance, the ribbon piece has a structure in which a plurality of cords are coated by rubber. Thus, a plurality of cords can be simultaneously set by one adhering operation of the ribbon piece, thereby reducing the number of adhering operations in forming a tire reinforcing layer and significantly improving the operating efficiency.

Moreover, the ribbon piece is cut from the strip at a location which is adjacent to the rigid core, so that the transfer distance required for the ribbon piece when it is to be adhered onto the rigid core can be sufficiently reduced, irrespective of the inclination angle of the cords relative to the equatorial line of the rigid core. From such a point also, it is possible to improve the operational efficiency upon formation of the tire reinforcing layer.

In the above-mentioned apparatus, it is preferred that the transferring and adhering means is comprised of magnetic or vacuum attracting elements for attracting and holding at least both end portions of the ribbon piece, and a moving mechanism for moving the magnetic or vacuum attracting elements. It is further preferred that the moving mechanism is comprised of manipulators the number of which is the same as the number of the magnetic or vacuum attracting elements such that the magnetic or vacuum attracting elements are connected to hands of the respective manipulators.

The former arrangement is simple in structure and ensures that the ribbon piece is positively held, transferred and adhered, and the latter arrangement is capable of simply and readily coping with changes to the rigid core in terms of the shape and dimension of the outer peripheral surface.

In the apparatus according to the present invention, the transferring and adhering means may be comprised of magnetic or vacuum attracting elements for attracting and holding at least both end portions of the ribbon piece, a press mechanism for urging the magnetic or vacuum attracting elements onto the outer peripheral surface of the rigid core with a substantially uniform force, and a moving mechanism for moving the press mechanism.

With such an arrangement, it is possible to urge each regions of the ribbon pieces onto the outer peripheral surface of the rigid core by a substantially uniform force under the deformation of the press mechanism, irrespective of the shape and dimension of the outer peripheral surface of the rigid core, or adhering orientation of the ribbon piece on that outer peripheral surface. Moreover, by using only one press mechanism, complicated controls with respect to the locations, moving amounts, etc., of a plurality of attracting elements are unnecessary, besides that the operating speed can be increased.

Preferably, the press mechanism is comprised of a pair of levers of the same length, having respective one ends which are hinge-connected to each other. The other end of each lever is connected to one ends of a pair of lever yokes of the same length. The other ends of the yoke levers are connected to a leaf spring which extends linearly in a horizontal plane, such that the pair of levers and the pairs of lever yokes are under predetermined opening. The magnetic or vacuum attracting elements are then secured to the leaf spring of the press mechanism. With such an arrangement, the press mechanism functions in the same manner as automobile wipers and realizes uniform urging force for the ribbon piece.

When the pairs of yoke levers are provided in multiple stages, it is readily possible to increase the number of attracting elements. Also, when the moving mechanism for moving the press mechanism is formed as a manipulator, it is possible to reduce the facility cost, to further simplify the operation and control, and to further increase the operational speed.

BRIEF DESCRIPTION OF THE DRAWINGS

FIGS. 4(a) and 4(b) are views showing the press mechanism and magnetic attracting elements;

FIG. 5 is a perspective view showing the manner of adhering the ribbon piece to the outer peripheral surface of the core;

FIG. 6 is a schematic view showing the step of adhering the ribbon piece when the mode of transfer of the ribbon piece has been changed; and FIG. 7 is a front view showing another example of the press mechanism.

BEST MODE FOR CARRYING OUT THE INVENTION

The present invention will be further described below with reference to the embodiments shown in the accompanying drawings.

Figure 1:
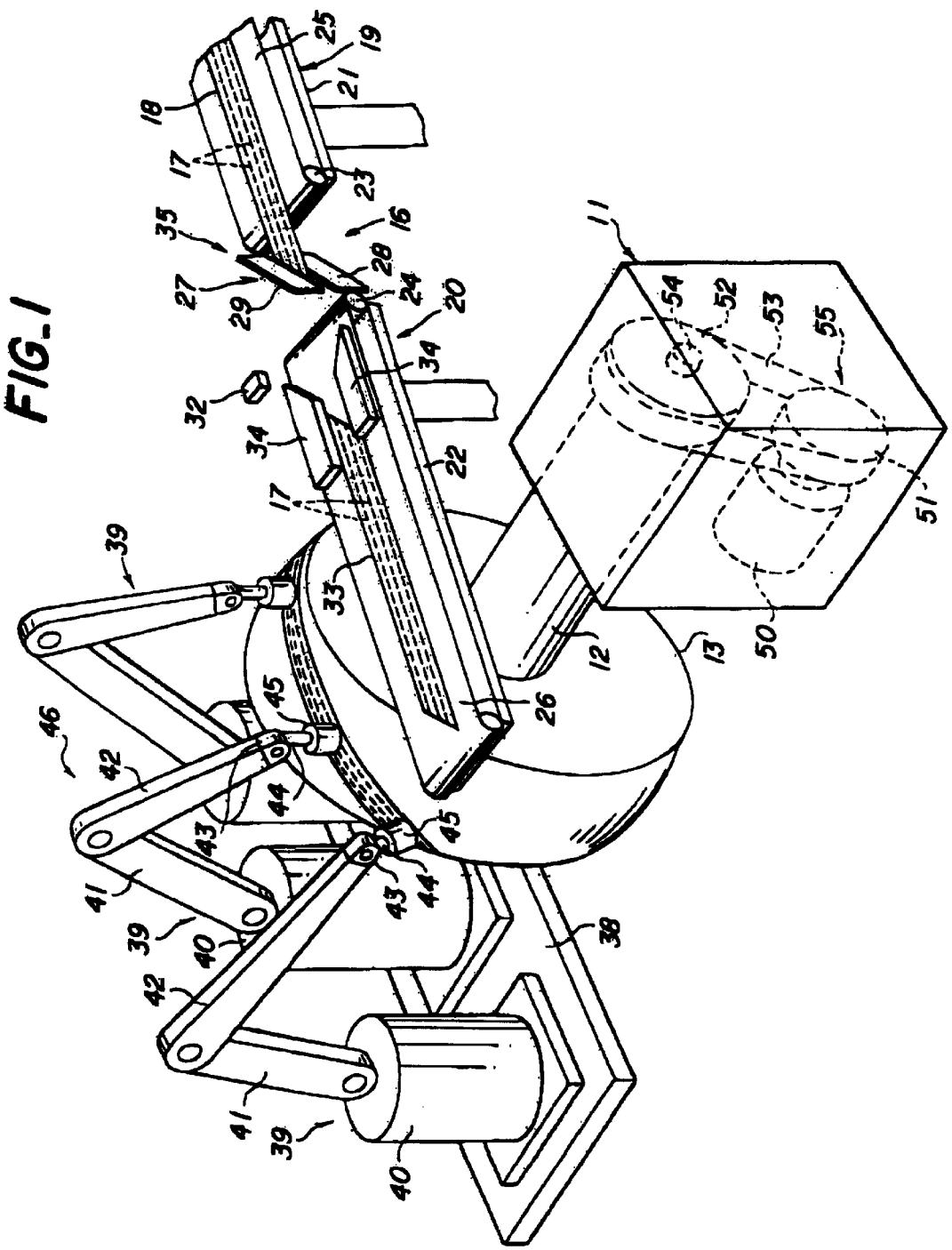
FIG. 1 is a perspective view showing one embodiment of the present invention.
Figure 2:
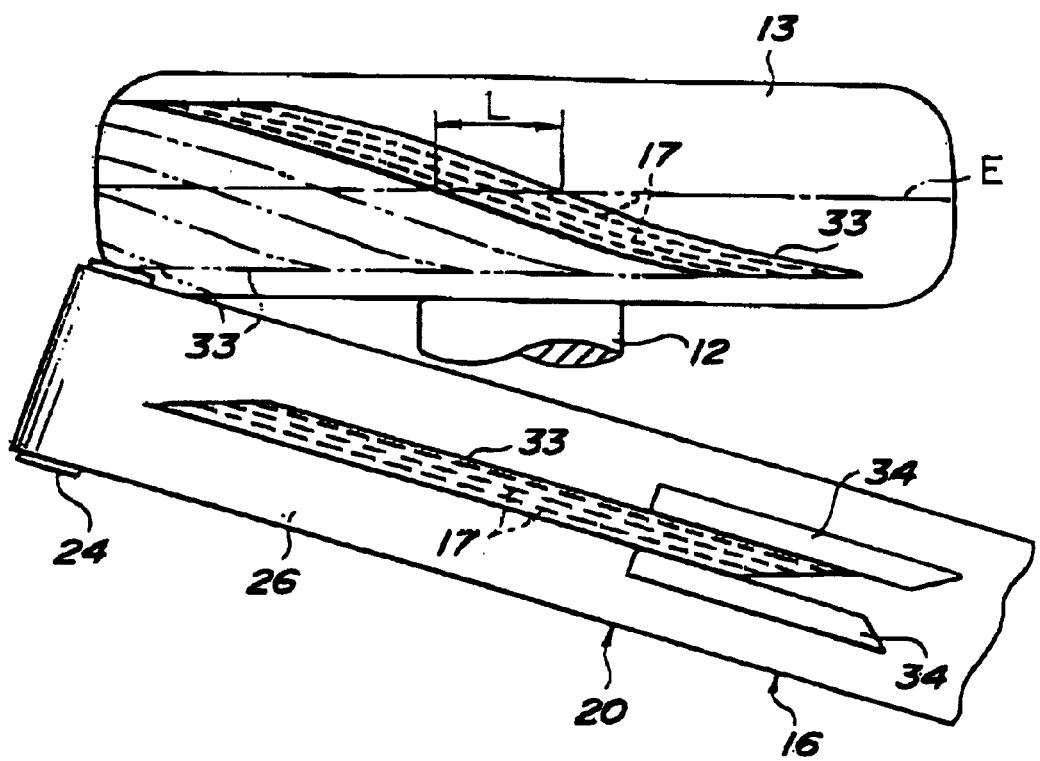
FIG. 2 is a plan view showing the rigid core and the transferring and cutting means.

In FIGS. 1 and 2, reference numeral 11 designates a drive portion which includes a rotatable main shaft 12 extending horizontally in the fore-and-aft direction. The main shaft 12 has a front end portion where a substantially toroidal rigid core 13 is detachably secure so as to be coaxial with the main shaft 12.

It is assumed that, in the illustrated arrangement, an inner liner, a carcass layer, etc., have already been formed on the outer peripheral surface of the rigid core.

Furthermore, reference numeral 16 designates a horizontal conveyor device which is inclined, as seen in the plan view of the rigid core 13 with previously formed layers, with reference to the equatorial line E by the same angle as the cords in the belt layer. The transfer conveyor device 16 can be operated so that a ribbon-like strip 18 is transferred to a location adjacent to the rigid core 13. It is also possible to arrange the transfer conveyor device in parallel with, or at right angles to the equatorial line E of the rigid core 13.

The ribbon-like strip 18 is comprised of a plurality of steel or textile cords 17, for example two to eight cords, which extend in parallel with each other and are coated by rubber. The ribbon-like strip 18 may be immediately after having been molded, or may be the one which has been once wound into a roll-shape after it has been molded.

The transfer conveyor device 16 is comprised of a first conveyor 19 arranged at a location which is spaced from the rigid core 13, and a second conveyor arranged at a location which is adjacent to the rigid core 13. The second conveyor 20 intersects with the main shaft 12 on its upper side. The first and second conveyors 19, 20 are comprised of stationary frames 21, 22 extending in the longitudinal direction of the conveyor device 16, pairs of rollers 23, 24 rotatably supported at both end portions of the respective stationary frames 21, 22, belts 25, 26 extending between, and passed over the rollers 23, 24 of the respective pairs, and motors (not shown) for driving one of the rollers 23, 24 of the respective pairs into rotation so that the belts 25, 26 are driven to assume running condition.

Between the first and second conveyors 19, 20, there is arranged a so-called guillotine-type cutting mechanism 27 for cutting the ribbon-like strip 18 obliquely in its width direction while it is being transferred. The cutting mechanism is comprised of a stationary cutter blade 28 which extends horizontally at a predetermined inclination angle with respect to the running direction of the first and second conveyors 19, 20, and a movable upper cutter blade 29 which is vertically movably arranged on the upper side of the stationary lower blade 28 and which cooperates with the stationary lower cutter blade 28 during its downward movement.

Such a cutting mechanism may be replaced by a so-called ring-type device which is comprised of a stationary anvil and a rotary ring cutter which is movable along the stationary anvil, or a knife-type device which is comprised of a stationary anvil and a movable knife which is movable along the stationary anvil.

Reference numeral 32 designates a detector sensor arranged immediately above the upstream end portion of the second conveyor 20. The detector sensor 32 serves to detect the leading end of the ribbon-like strip 18 while it is being transferred, and functions to output a detection signal to a control means, not shown. The control means, when supplied with the detection signal, causes the first and second conveyors 19, 20 to run over a predetermined distance and stops the running of the conveyors 19, 20 when the leading end of the ribbon-like strip 18 is spaced from the cutting mechanism 27 by a predetermined distance.

The above-mentioned cutting mechanism 27 is operated in response to the stopping operation of the conveyors 19, 20 and cuts the ribbon-like strip 18 obliquely in its width direction so as to separate a ribbon piece 33 of a predetermined length from the leading end of the ribbon-like strip 18.

Reference numeral 34 designates a pair of guide members which are arranged at a location corresponding to the upstream end portion of the second conveyor 20. These guide members 34 are arranged to extend in the longitudinal direction of the second conveyor 20, such that they are spaced from each other by an amount which is the same as the width of the ribbon-like strip 18. Thus, when ribbon-like strip 18 transferred by the second conveyor 20 passes a location between the guide members 34, the ribbon-like strip 18 is pushed by the guide members 34 from both sides so as to define the widthwise position on the conveyor.

The above-mentioned transfer conveyor device 16, the cutting mechanism 27, the detection sensor 32 and the guide members 34 as a whole constitute a transferring and cutting means 35 for transferring the ribbon-like strip 18 to a location adjacent to the rigid core 13, and cutting the ribbon-like strip 18 into a predetermined length to form a ribbon piece 33.

Reference numeral 38 designates a horizontal base which is arranged on the front side of the rigid core 13. A plurality of manipulators, e.g., three manipulators are arranged on the base 38 as a moving means which, in the illustrated embodiment, are in the form of vertical, multiple-freedom type industrial robots 39. These robots 39 are arranged along a line which is in parallel with the equatorial line E of the rigid core 13.

Each robot 39 is comprised of a main body 40 which is rotatable about a vertical axis, a first arm 41 having a proximal end which is connected to the upper end of the main body 40 so that it can be swung in a vertical plane, a second arm 42 having a proximal end which is connected to the distal end of the first arm 41 so that it can be swung in a vertical plane, a first hand 43 connected to the distal end of the second arm 42 so that it can be rotated about the center axis of the second arm 42, and a second hand 44 having a proximal end connected to the distal end of the first hand 43 so that it can be swung in a plane which includes the rotational axis of the first hand 43. The second hand 44 has a distal end secured to a magnet body 45 which is rotatable about the center axis of the second hand 44 and is comprised, e.g., of an electromagnet. In operation, the magnet body 45 holds the ribbon piece 33 by attracting, e.g., the steel-type cords 17 when it is supplied with an electric current, and releases the ribbon piece 33 when the current supply is interrupted.

In the illustrated embodiment, three magnet bodies 45 and three robots 39 are provided as mentioned above, so that the ribbon piece 33 is transferred while being attracted and held by the magnet bodies 45 and the robots 39 at its both end portions and the center portion. Alternatively, however, the ribbon piece 33 may be transferred while being attracted and held only at its end portions by two magnet bodies provided for two robots, respectively, or while being attracted and held by the magnet bodies provided for four or more robots, respectively.

The robots 39 serve to move the magnet bodies 45 to a desired location along a previously memorized path, while maintaining their initial postures. More specifically, in the illustrated embodiment, the magnet bodies 45 are moved by the robots along the center axis of the main shaft 12 to a position which corresponds to the outer peripheral surface of the rigid core 13. Subsequently, the magnet bodies 45 are caused to undergo relative movements into conformity with the curvature of the outer peripheral surface of the rigid core 13 so as to adhere the ribbon piece 33 onto the outer peripheral surface. During such an adhering process, the ribbon piece 33 assumes a posture relative to the outer peripheral surface of the rigid core 13, in which it is inclined at a predetermined angle with respect to the equatorial line E of the rigid core 13.

During the process of adhering the ribbon piece 33 in the manner described above, when the magnet bodies 45 attracting the both longitudinal end portions of the ribbon piece 33 are slightly rotated in a counterclockwise direction, the cord inclination angle at the longitudinal end portions of the ribbon piece 33 with respect to the equatorial line E may be made smaller than the cord inclination angle at the longitudinal center portion, as illustrated, so as to improve the tension bearing property or the so-called hoop effect at the side edge portions of the belt layer which is being formed. Alternatively, the magnet bodies 45 may be maintained without being rotated so that the ribbon piece is adhered in its linear state, or the both magnet bodies 45 attracting the end portions of the ribbon piece may be slightly rotated in a clockwise direction so that the ribbon piece is adhered to the outer peripheral surface of the rigid core 13 in a state wherein it is deformed in the opposite direction as compared to the above-mentioned case.

The above-mentioned robots 39 and the magnet bodies 43 as a whole constitute a transferring and adhering means 46 for transferring the ribbon piece 33 substantially in its width direction, from the transferring and cutting means 35 to the outer peripheral surface of the rigid core 13, and adhering the ribbon piece 33 onto the outer peripheral surface at a predetermined inclination angle with respect to the equatorial line E of the core.

In this way, by constituting the transferring and adhering means 46 from the two or more magnet bodies 45 and a moving mechanism for achieving the movement of the magnet bodies 45, it is possible to positively hold and transfer the ribbon piece 33 with a simplified structure. Moreover, when the robots 39 are used as the moving mechanism, it is possible readily and promptly cope with changes to the kind of the rigid core in terms of shape and dimension of the outer peripheral surface.

Reference numeral 50 designates a motor which is accommodated in the above-mentioned drive portion 11. A pulley 51 is fixedly connected to the output shaft of the motor 50, and another pulley 52 is fixedly connected to the above-mentioned main shaft 12. A timing belt 53 is passed over these pulleys 51 and 52.

Reference numeral 54 designates an encoder connected to the main shaft 12 for detecting the rotating amount thereof. When the main shaft 12 has rotated by a predetermined amount which corresponds to the circumferential length of the ribbon piece 33 adhered onto the outer peripheral surface of the rigid core 13, the encoder 54 outputs a signal to the above-mentioned motor 50 to stop the operation thereof.

The above-mentioned motor 50, the pulleys 51, 52, the timing belt 53 and the encoder 54 as a whole constitute a rotating means which causes the rotation of the rigid core 13 about its center axis by an amount corresponding to the circumferential length L of the ribbon piece 33 on the rigid core 13.

The operation of the above-mentioned apparatus according to the present invention will be explained below.

First of all, the first and second conveyors 19, 20 of the transferring and cutting means 35 are synchronously driven by operating their respective motors, to thereby transfer the ribbon-like strip 18 in its longitudinal direction toward the rigid core 13.

During such transfer, the ribbon-like strip 18 passes between the guide members 34 with its side edges defined thereby, so that the widthwise position of the ribbon-like strip 18 on the conveyor is always defined as a predetermined position. Also, the passage of the leading end of the ribbon-like strip 18 during the transfer is detected by the detector sensor 32, and the resulting detecting signal is input to the control means. As a result, both conveyors 19m 20 are driven for a constant duration from the input of the detecting signal, thereby causing the ribbon-like strip 18 to be transferred to a location adjacent to the outer peripheral surface of the rigid core 13. That is to say, from the time point of input of the detecting signal of the detector sensor 32 to the control means, the operation of the conveyors 19, 20 is maintained for a constant duration so that the ribbon-like strip 18 is advanced by a predetermined distance and the leading end of the ribbon-like strip 18 is spaced from the cutting mechanism 27 by a predetermined distance. On the other hand, after the lapse of the constant duration, the control means outputs a stopping signal to the motors for the conveyors 19, 20 to interrupt their operations.

Thereafter, the movable upper blade 29 of the cutting mechanism 27 is caused to move downwards so as to cut the ribbon-like strip 18 obliquely in its width direction to form a ribbon piece 33.

Subsequently, the robots 39 of the transferring and cutting means 46 are operated so that the magnet bodies 45 are moved toward the second conveyor 20 and magnets 45 are urged against the both end portions and the center portion of the ribbon piece 33. Then, the magnet bodies 45 are supplied with an electric current, thereby attracting the steel cords 17 to hold the end portions and the center portion of the ribbon piece 33, respectively.

In such a condition, the robots 39 are synchronously operated and the magnet bodies 45 attracting and holding the ribbon piece 33 is thereby moved from the location above the second conveyor 20 in the width direction of the ribbon piece 33, i.e., toward an axially front side of the main shaft 12 in the illustrated embodiment, so that the ribbon piece 33 is transferred onto the outer peripheral surface of the rigid core 13. Then, while adjusting the relative positions of the magnet bodies 45 into conformity with the curvature of the outer peripheral surface of the rigid core 13, the ribbon piece 33 is adhered onto the outer peripheral surface of the rigid core 13 with an orientation in which it is inclined to the equatorial line E of the core at a predetermined angle.

In this instance, before the adhering operation of the ribbon piece 33, the magnet bodies 45 attracting and holding its end portions may be slightly rotated in a counterclockwise direction.

As explained above, the ribbon piece 33 is cut from the ribbon-like strip 18 which has been transferred to a location adjacent to the outer peripheral surface of the rigid core 13, and is transferred to the outer peripheral surface of the core in its width direction. Moreover, the ribbon piece 33 itself includes a plurality of cords extending in parallel with each other. Thus, the transfer distance of the ribbon piece 33 is small even when the ribbon piece is inclined to the equatorial line E of the core by a small angle. It is therefore possible to reduce the number of adhering operations for the ribbon pieces 33 and thereby improve the efficiency of the adhering operations.

Furthermore, after completion of such adhering operation of the ribbon piece 33, the motor 50 for the rotating means 55 is operated so as to rotate the main shaft 12 and the rigid core 13 about the center axis by a predetermined amount, i.e., an amount which corresponds to the circumferential length L of the ribbon piece 33 which has been adhered onto the outer peripheral surface of the core. When the rotating amount of the rigid core reaches a predetermined value, the encoder 54 outputs a signal to the motor 50 to stop the operation thereof.

Thereafter, the above-mentioned steps are repeated so that the ribbon pieces are successively adhered onto the outer peripheral surface of the core, with the opposite side edges in close contact with each other, to form the desired belt layer.

Since the ribbon piece 33 includes a plurality of cords 17, as explained above, and the adhesion of a single ribbon piece 33 allows a simultaneous setting of a plurality of cords 17, the belt layer can be formed with a reduced number of adhering operations thereby significantly improving the operational efficiency.

In the above-mentioned embodiment of the present invention, after the transfer of the ribbon-like strip 18 and the formation of the ribbon piece 33 have been completed, the ribbon piece 33 is transferred to the outer peripheral surface of the rigid core 13 and adhered thereto, and the rigid core 13 is then rotated by a predetermined angle. It is alternatively possible according to the present invention to perform the transfer of the ribbon-like strip and formation of the ribbon piece as external operations simultaneously with the transfer and adhesion of the ribbon piece and the rotation of the rigid core, to further improve the operational efficiency.

In the above-mentioned embodiment of the present invention, the position of the ribbon-like strip in its width direction is defined by passing the ribbon-like strip 18 through a position between a pair of guide members 34. It is alternatively possible according to the present invention to define the widthwise position of the ribbon-like strip by providing a plurality of guide rollers which are obliquely arranged with an inclination so that the ribbon-like strip is always in contact with the guide rollers on its one side, or by arranging guide magnets on one side of the ribbon-like strip so as to attract the steel cords within the ribbon-like strip.

In the above-mentioned embodiment of the present invention, furthermore, it is assumed that an inner liner, a carcass layer, etc., have previously been formed on the outer peripheral surface of a substantially toroidal rigid core. However, such initial formation layers may be dispensed with, and the substantially toroidal rigid core may be replaced by a cylindrical drum.

When the cords forming the ribbon-like body are comprised of organic fiber cords, it is of course that vacuum attracting elements are applied instead of magnetic attracting elements.

Figure 3:
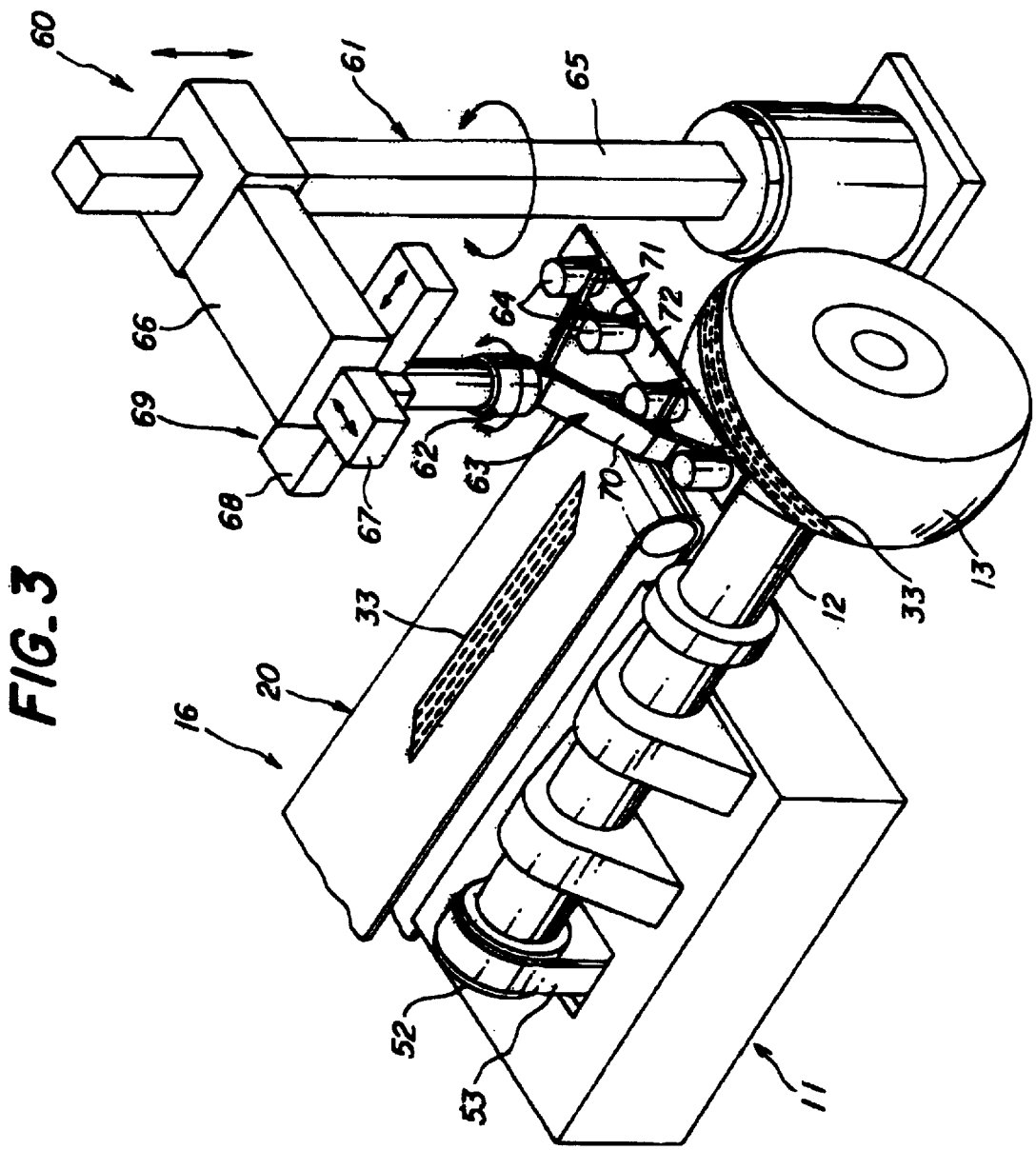
FIG. 3 is a perspective view showing another embodiment of the present invention.

FIG. 3 is a perspective view showing another embodiment of the present invention in which the transferring and adhering means has been modified as compared to the previous embodiment.

The transferring and adhering means 60 according to this embodiment is comprised of a moving mechanism in the form of a manipulator 61 which may be arranged in front of the rigid core 13 connected to the main shaft 12, or on one side thereof as illustrated. The manipulator 61 has a final movable stage in the form of a wrist portion 62 which is connected to a single press mechanism 63 to be described hereinafter. The press mechanism 63 is provided with a plurality of magnetic or vacuum attracting elements for attracting and holding at least both end portions of the ribbon piece 33, which, for example, are comprised of magnetic attracting elements 64.

The manipulator 61 is comprised of a post 65 which is rotatable about a vertical axis and which supports an elevation arm 66 extending horizontally therefrom. The elevation arm 66 is provided with a transfer mechanism 69 comprised of an advancing arm 67 which is movable horizontally in the axial direction of the axial direction of the elevation arm, and a carrier 68 which is movable horizontally in a direction perpendicular to the horizontal moving direction of the advancing arm 67 and serves to hold the wrist portion 62 so that the wrist portion 62 can be rotated about a vertical axis.

As shown in FIG. 4a, the press mechanism 63 is comprised of a pair of levers 70 of the same length, having respective one ends which are hinge-connected to each other. Each lever 70 has the other end which is connected to one ends of a pair of lever yokes 71 of the same length. The other ends of the lever yokes 71 are connected to a leaf spring 72 which extends linearly in a horizontal plane. The pair of levers 70 and the pairs of lever yokes 71 are maintained under predetermined openings. It is preferred that the of levers 70 of the pair are biased toward each other and the lever yokes 71 of each pair are biased in directions away from each other, by respective springs.

With such an arrangement of the press mechanism 63, after the leaf spring 72 has been deformed along the outer peripheral surface of the rigid core 13, the biasing springs assist resilient restoration of the leaf spring 72 to its initial shape.

The magnetic attracting element 64 can be secured to the press mechanism 63 of such an arrangement, for example, at a location which corresponds to the hinge connection of the lever yoke 71 to the leaf spring 72, where the bottom surface of a cylindrical housing 73 of the magnetic attracting element 64 is threadedly secured to the leaf spring 72 at the periphery of an opening formed in the leaf spring 72, as shown in FIG. 4b. In this instance, in order t prevent an interference of the lever yoke 71 with the magnetic attracting element 64 and maintain an overall weight balance, it is preferred for the lever yokes 71 of each pair to have a frame structure which is arranged to bridge over the magnetic attracting element 64, as shown in FIG. 3.

The magnetic attracting element 64 in the illustrated embodiment may have an arrangement wherein the cylindrical housing 73 is provided therein with a cylinder 74 including a piston rod 75 of which the distal end serves to hold a magnet 76 which may be in the form of a permanent magnet. In this instance, when the piston rod 75 is in its extended position, the magnet 76 is substantially in alignment with the lower surface of the leaf spring 72 so as to attract and hold the ribbon piece 33 which is mainly composed of steel cords. On the other hand, when the piston rod 75 is retracted, the magnet 76 is spaced from the ribbon piece 33 to release it.

In order to adhere the ribbon piece 33 onto the outer peripheral surface of the rigid core 13 with the transferring and adhering means 60 having the above-mentioned structure, first of all, the manipulator 66 is operated so that the leaf spring 72 of the press mechanism 63 assuming a flat state is brought into contact and alignment with the ribbon piece 33 which has been transferred by the conveyor 20 to a location adjacent to the rigid core 13. The piston rods 75 of the magnetic attracting elements 64 are then advanced so that the ribbon piece 33 is attracted by the magnets 76.

Subsequently, the ribbon piece 33 is lifted together with the magnetic attracting elements 64 and transferred onto the outer peripheral surface of the rigid core 13. The ribbon piece 33 and the leaf spring 72 are then arranged, under the operation of the wrist portion 62 of the manipulator 61, to have a desired inclination angle with respect to the equatorial line of the rigid core which is in a predetermined angular position.

Thereafter, the elevation arm 66 of the manipulator 61 is moved downwards, thereby causing the ribbon piece 33 to contact the outer peripheral surface of the rigid core and deforming the press mechanism 63 as shown in FIG. 5. The leaf spring 72 then functions like an automobile wiper blade, and serves to urge the ribbon piece 33 in conformity with the outer peripheral surface of the rigid core, under a sufficiently uniform force, and adhere the ribbon piece 33 to the outer peripheral surface of the rigid core.

It is to be noted that the deflecting deformation of the leaf spring 72 along the outer peripheral surface of the rigid core is caused by the relative rotation of the lever yoke 71 about its hinge connection to the leaf sprig 72. Therefore, it is preferred that the hinge connection is arranged as close as possible, to the lower surface of the lead spring 72 and, hence, the ribbon piece 33 attracted thereby. Such an arrangement makes it possible to prevent relative displacement, in the longitudinal direction, between the ribbon piece 33 and the leaf spring 72, upon the deflecting deformation of the leaf spring 72 after the ribbon piece 33 has been attracted and held in place.

Instead of the arrangement shown in FIG. 4, the press mechanism may be arranged such that the other end of the lever yoke 71 is hinge-connected to the cylindrical housing 73 of the magnetic attracting element 64 so that the leaf spring 72 is connected indirectly to the lever yoke 74 through the magnetic attracting element 64. With such an arrangement also, the press mechanism as a whole, inclusive of the magnetic attracting elements 64, functions like a wiper blade so that leaf spring 72 is smoothly deformed along the outer peripheral surface of the rigid core and the ribbon piece 33 held thereby is urged against the outer peripheral surface of the rigid core with a uniform downward force at any portion in its longitudinal direction.

FIG. 6 is a schematic view showing the operation of the transferring and adhering means 60 under a different transfer mode of the ribbon piece 33, wherein the ribbon piece 33 is transferred in a direction perpendicular to the center axis of the rigid core 13.

In this instance also, the ribbon piece 33 is adhered onto the outer peripheral surface of the rigid core under a desired orientation, as follows. First of all, the magnetic attracting elements 64 are operated so as to attract and hold the ribbon piece 33 which has been transferred by the conveyor to a location adjacent to the rigid core 13. Subsequently, by operating the manipulator 61, the ribbon piece 33 is translated or moved horizontally to a location above the outer peripheral surface of the rigid core. The wrist portion 62 of the manipulator 61 is then operated to rotate the press mechanism 63 so that the ribbon piece attracted and held thereby extends in the desired direction which is inclined with respect to the equatorial line of the rigid core 13. Thereafter, the elevation arm 66 is moved downwards and the press mechanism 63 is operated so that the ribbon piece 33 is deformed along the outer peripheral surface of the rigid core. As a result, the ribbon piece 33 is thus urged against the outer peripheral surface of the rigid core sufficiently uniformly over the entire length, and is thus adhered in the desired manner.

Then, the rigid core 13 is rotated by a predetermined amount, and the above-mentioned adhering operation is repeated.

It is of course possible to change the securing location of the magnetic attracting elements 64 to the press mechanism and the number of the same as desired, within a range wherein the magnetic attracting elements 64 do not cause unnecessary or excessive deflecting deformation of the leaf spring 72. Thus, in the arrangement shown in FIG. 4 by way of example, five or more magnetic attracting elements 64 may be arranged on the leaf spring at constant intervals so that the ribbon piece 33 can be attracted and held more uniformly, thereby ensuring that the ribbon piece 33 is properly adhered onto the outer peripheral surface of the rigid core at any time, irrespectively of the weight of the ribbon piece.

Furthermore, when the ribbon piece 33 has an increased length in association with various dimensions of the rigid core 13, besides that the lever 70 and the lever yokes 71 shown in FIG. 4 are modified to have increased length, the pairs of the lever yokes are arranged in a plurality of stages so that the press mechanism and, hence, the leaf spring to have increased length. One such example is shown in FIG. 7, wherein the lever yokes are provided in two stages. More particularly, the levers 70 of a pair are each hinge-connected to a pair of lever yokes 71, and the other end of each lever yoke 71 is hinge-connected to a pair of lever yokes 77 of the second stage, such that the other end of each lever yoke 77 is connected to the leaf spring 72. With such arrangement, the length of the press mechanism 63 can be increased by an amount which corresponds to the additional provision of the lever yokes 77 of the second stage, and it is thus possible to increase the number of the magnetic attracting elements 64 in accordance with the increased length.

Therefore, by constructing the transferring and adhering means 60 in the manner described above, under the operation of the press mechanism 63, the ribbon piece 33 can be urged against the outer peripheral surface of the core with a downward force which is sufficiently uniform over the entire length, thereby ensuring that the ribbon piece is more properly adhered in place. Moreover, the adhering operation is carried out only by the operation and control of a single manipulator 61, thereby making it possible to further increase the operating speed.

INDUSTRIAL APPLICABILITY

It will be appreciated from the foregoing description that, according to the present invention, it is possible to highly efficiently form a tire reinforcing layer on the outer peripheral surface of a rigid core.

What is claimed is:

1. A method for forming a tire reinforcing layer, comprising the steps of: transferring a strip, which is comprised of a plurality of rubber-coated cords extending in parallel with each other, to a location adjacent to a rigid core having a circular outer contour, and cutting the strip into a predetermined length to form a ribbon piece; transferring the ribbon piece onto an outer peripheral surface of the rigid core using a plurality of manipulators which comprise magnetic or vacuum attracting elements and adhering the ribbon piece in conformity to said outer peripheral surface as being inclined with reference to an equatorial line of the rigid core by a predetermined angle; and rotating the rigid core about a center axis thereof, by an angle which corresponds to the length of the ribbon piece in the circumferential direction; said steps being repeated so that the ribbon pieces are successively adhered to the outer peripheral surface of the rigid core while side edges of adjacent ribbon pieces are brought into close contact with each other; wherein the number of manipulators is the same as the number of the magnetic or vacuum attracting elements such that said magnetic or vacuum attracting elements are connected to hands of the respective manipulators, and wherein the number of manipulators is three or more.

2. An apparatus for forming a tire reinforcing layer, comprising: transferring and cutting means for transferring a strip, which is comprised of a plurality of rubber-coated cords extending in parallel with each other, to a location adjacent to a rigid core having a circular outer contour, and cutting the strip into a predetermined length to form a ribbon piece; transferring and adhering means for transferring the ribbon piece onto an outer peripheral surface of the rigid core and adhering the ribbon piece to said outer peripheral surface as being inclined with reference to an equatorial line of the rigid core by a predetermined angle; and rotating means for rotating the rigid core about a center axis thereof, by an angle which corresponds to the length of the ribbon piece in the circumferential direction; wherein the transferring and adhering means transfer and adhere the ribbon piece using relative movements in conformity with the outer peripheral surface of the rigid core; wherein said transferring and adhering means are comprised of magnetic or vacuum attracting elements for attracting and holding at least both end portions of the ribbon piece, and a moving mechanism for moving the magnetic or vacuum attracting elements; wherein the moving mechanism is comprised of manipulators the number of which is the same as the number of the magnetic or vacuum attracting elements such that said magnetic or vacuum attracting elements are connected to hands of the respective manipulators; and wherein the number of manipulators is three or more.

3. An apparatus for forming a tire reinforcing layer, comprising: transferring and cutting means for transferring a strip, which is comprised of a plurality of rubber-coated cords extending in parallel with each other, to a location adjacent to a rigid core having a circular outer contour, and cutting the strip into a predetermined length to form a ribbon piece; transferring and adhering means for transferring the ribbon piece onto an outer peripheral surface of the rigid core and adhering the ribbon piece to said outer peripheral surface as being inclined with reference to an equatorial line of the rigid core by a predetermined angle; rotating means for rotating the rigid core about a center axis thereof, by an angle which corresponds to the length of the ribbon piece in the circumferential direction; and wherein said transferring and adhering means are comprised of magnetic or vacuum attracting elements for attracting and holding at least both end portions of the ribbon piece, a press mechanism for urging said magnetic or vacuum attracting elements onto the outer peripheral surface of the rigid core with a substantially uniform force, and a moving mechanism for moving the press mechanism; and wherein the press mechanism deforms in conformity with the outer peripheral surface of the rigid core.

4. The apparatus for forming a tire reinforcing layer according to claim 3, wherein said press mechanism is comprised of a pair of levers of the same length, said levers having respective one ends which are hinge-connected to each other, said levers each having the other end connected to one ends of a pair of lever yokes of the same length, said lever yokes having respective other ends connected to a leaf spring which extends linearly in a horizontal plane, such that said pair of levers and said pairs of lever yokes are under predetermined opening, and wherein said magnetic or vacuum attracting elements are secured to the leaf spring of the press mechanism.

5. The apparatus for forming a tire reinforcing layer according to claim 4, wherein said moving mechanism for moving the press mechanism is comprised of a manipulator comprising a body that is rotatable about a vertical axis and which supports an elevation arm extending therefrom; and wherein the press mechanism is associated with the extending arm.

6. The apparatus for forming a tire reinforcing layer according to claim 3, wherein said moving mechanism for moving the press mechanism is comprised of a manipulator comprising a body that is rotatable about a vertical axis and which supports an elevation arm extending therefrom; and wherein the press mechanism is associated with the extending arm.

* * * * *